United States Patent
Kanai et al.

(10) Patent No.: US 6,429,704 B1
(45) Date of Patent: Aug. 6, 2002

(54) POWER CONSUMPTION REDUCTION METHOD, POWER CONSUMPTION REDUCTION CIRCUIT, CONTROL CIRCUIT, AND HARD DISK DRIVE APPARATUS

(75) Inventors: Toshio Kanai, Moriyama; Masayuki Murakami, Fujisawa; Yasuhiro Takase, Sagamihara, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/675,547

(22) Filed: Sep. 28, 2000

(30) Foreign Application Priority Data

Sep. 28, 1999 (JP) .............................. 11-274129

(51) Int. Cl.⁷ .............................................. H03B 19/00
(52) U.S. Cl. ........................................ 327/113; 327/544
(58) Field of Search .......................... 327/113–117, 99, 327/198, 298, 544, 143

(56) References Cited

U.S. PATENT DOCUMENTS 5,222,239 A * 6/1993 Rosch ........................ 395/750
5,319,772 A * 6/1994 Hwang ....................... 395/550
5,475,324 A * 12/1995 Tomiyori .................... 327/154
5,956,289 A * 9/1999 Norman et al. ........ 365/185.23
6,026,498 A * 2/2000 Fuse et al. .................. 713/400

FOREIGN PATENT DOCUMENTS

| JP | 06-089406 | 3/1994 |
| JP | 06-103592 | 4/1994 |
| JP | 08-106742 | 4/1996 |
| JP | 10-134532 | 5/1998 |

\* cited by examiner

*Primary Examiner*—Terry D. Cunningham
*Assistant Examiner*—Quan Tra
(74) *Attorney, Agent, or Firm*—Paik Saber; Bracewell & Patterson L.L.P.

(57) ABSTRACT

A power consumption reduction circuit includes a clock frequency downconverting circuit. The clock frequency downconverting circuit downconverts a frequency of a CK signal, which is inputted, when a POR signal inputted is asserted, and outputs the CK signal to an IC selection circuit. In addition, if the POR signal inputted is negated, the clock frequency downconverting circuit outputs the CK signal inputted as it is to the IC selection circuit. A signal outputted from the clock frequency downconverting circuit is supplied to a plurality of ICs through the IC selection circuit.

5 Claims, 8 Drawing Sheets

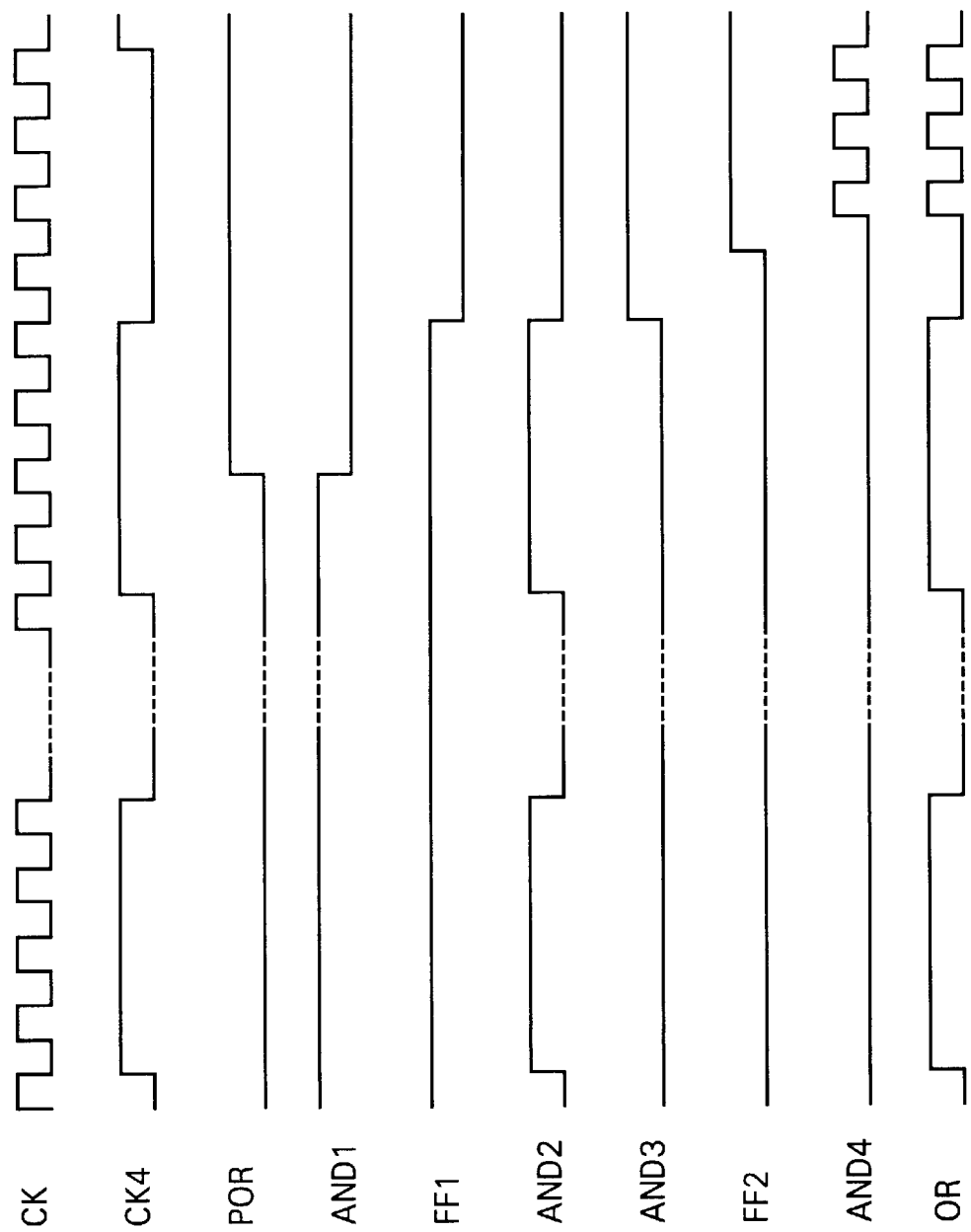
*Fig. 4* (Amended)

POWER CONSUMPTION REDUCTION METHOD, POWER CONSUMPTION REDUCTION CIRCUIT, CONTROL CIRCUIT, AND HARD DISK DRIVE APPARATUS

BACKGROUND OF THE INVENTION

1. Technical Field

The present invention relates to a power consumption reduction method of reducing the power consumption of an electronic circuit operating on the basis of a clock signal, and a circuit thereof, and in particular, to a power consumption reduction method of reducing the power consumption at the time of power-on, and a circuit thereof.

2. Description of the Related Art

In hard disk drive (HDD) apparatuses, further increase of recording density has been attempted and increase of storage capacity has been attempted. By attempting the increase of storage capacity, smaller HDD apparatuses such as one-inch HDD apparatuses have been developed. The one-inch HDD apparatuses are used in hand-held information devices such as so-called notebook-sized personal computers, PDAs (Personal Digital Assistance), and digital cameras. The reduction of power consumption is required of these hand-held information devices so as to elongate battery-operating time. For this reason, the reduction of power consumption is also required of HDD apparatuses.

FIG. 8 is a diagram showing the schematic configuration of a control circuit in a conventional HDD apparatus. As shown in FIG. 8, a control circuit 1 comprises a plurality of ICs (Integrated Circuits) 11, 12, . . . , 13. The ICs 11, 12, . . . , 13 are connected to each other via a bus 14. These ICs 11, 12, . . . , 13 are configured with being classified into respective functions such as an HDC (Hard Disk Controller), MPU (Micro Processing Unit), memory, drivers, and an HI (Host Interface).

In addition, a control circuit 1 comprises a power consumption reduction circuit 10 connected to each of ICs 11, 12, . . . , 13. A clock signal generator 2 and a reset IC 3 are connected to the power consumption reduction circuit 10. The clock signal generator 2 and reset IC 3 are provided out of the control circuit 1. The clock signal generator 2 outputs a clock signal having a predetermined frequency. The reset IC 3 outputs a power-on-reset signal at the time of power-on.

The power consumption reduction circuit 10 selects ICs, which should operate, from among ICs 11, 12, . . . , 13. The clock signal is outputted to the ICs selected by the power consumption reduction circuit 10, and is not outputted to ICs not selected by the power consumption reduction circuit 10. For this reason, the ICs not selected are made to be stopped. In this manner, since it is possible to output the clock signal only to the ICs that should operate, it is possible to reduce the power consumption of the HDD apparatus.

Problems to be Solved by the Invention

Nevertheless, in a conventional power consumption reduction method and a circuit thereof, since each IC is initialized at the time of power-on, it is necessary to output the clock signal to all the ICs. Therefore, the conventional method and circuit thereof have such a problem that it is not possible to reduce the power consumption at the time of power-on.

The present invention is intended to solve such a problem, and an object of the present invention is to provide a power consumption reduction method, a power consumption reduction circuit, a control circuit, and a hard disk drive apparatus that can reduce the power consumption at the time of power-on.

SUMMARY OF THE INVENTION

A power consumption reduction method according to the present invention is-a power consumption reduction method of outputting a clock signal to at least one electronic circuit and reducing power consumed by the at least one electronic circuit, and is characterized in that the method comprises the steps of monitoring a power-on-reset signal at the time of power-on, and outputting the clock signal, having a frequency lower than a frequency at the time of the at least one electronic circuit operating, to the at least one electronic circuit until this power-on-reset signal is negated.

In addition, a power consumption reduction circuit according to the present invention is characterized in that the circuit has a clock signal input terminal for inputting a clock signal, a power-on-reset signal input terminal for inputting a power-on-reset signal, and a clock signal output terminal for outputting the clock signal, and downconverts a frequency of the clock signal inputted through the clock signal input terminal and outputs the clock signal through the clock signal output terminal until the power-on-reset signal inputted through the power-on-reset signal input terminal is negated.

Furthermore, a control circuit according to the present invention is characterized in that the control circuit comprises at least one electronic circuit operating on the basis of a clock signal, and a power consumption reduction circuit having a clock signal input terminal for inputting the clock signal, a power-on-reset signal input terminal for inputting a power-on-reset signal, and a plurality of clock signal output terminals, each of which is connected to each of the at least one electronic circuit, for outputting the clock signal, and the power consumption reduction circuit downconverts a frequency of the clock signal, inputted through the clock signal input terminal, and outputs the clock signal through the clock signal output terminal at the time of power-on until a power-on-reset signal, which is inputted through the power-on-reset signal input terminal, is negated.

In addition, a hard disk drive apparatus according to the present invention is a hard disk drive apparatus that moves a magnetic head to a recording surface of a rotating magnetic disk and performs record/playback of data on the recording surface of the magnetic disk by this magnetic head, the hard disk drive apparatus which is characterized in that the hard disk drive apparatus comprises at least one electronic circuit operating on the basis of a clock signal, and a power consumption reduction circuit having a clock signal input terminal for inputting the clock signal, a power-on-reset signal input terminal for inputting a power-on-reset signal, and a plurality of clock signal output terminals, each of which is connected to each of the at least one electronic circuit, for outputting the clock signal, and the power consumption reduction circuit outputs the clock signal through the plurality of clock signal output terminals with downconverting a frequency of the clock signal inputted through the clock signal input terminal at the time of power-on until the power-on-reset signal inputted through the power-on-reset signal input terminal is negated.

PREFERRED EMBODIMENTS

Hereinafter, a power consumption reduction method and a circuit thereof according to the present invention and their preferable embodiments will be described with reference to drawings.

The power consumption reduction method according to the present invention reduces the power consumption of an electronic circuit, operating on the basis of a CK (clock)

signal, at the time of power-on. This power consumption reduction method monitors a POR (Power-On Reset) signal at the time of power-on and downconverts a frequency of the CK signal, supplied to the electronic circuit, until this POR signal is negated.

Supposing that there is a plurality of electronic circuits, their entire power consumption A is composed of:

power consumption C without relating to the frequency of the CK signal; and power consumption f×M×K proportional to the frequency of the CK signal, and is expressed as follows:

$$A=C+f\times M\times K$$

Here, f: frequency of a CK signal;

M: constant; and

K: operating rate of a plurality of electronic circuits.

Since the CK signal is supplied to all the electronic circuits at the time of power-on, the operating rate K becomes 1. Therefore, by downconverting the frequency f of the CK signal, it is possible to reduce the power consumption of these electronic circuits.

As methods of downconverting the frequency of the CK signal supplied to an electronic circuit, there are a first method of dividing a frequency of an original CK signal, and a second method of sampling a CK signal, corresponding to one pulse, every plural pulse of an original CK signal. As described later, the second method is more advantageous at the point of being able to operate the electronic circuit earlier. Hard disk drive (HDD) apparatuses will be described, the hard disk drive apparatuses which use power consumption reduction circuits realizing these power consumption reduction methods.

FIG. 1 is a schematic diagram showing the configuration of an HDD apparatus of Embodiment 1 according to the present invention.

The HDD apparatus is a so-called one-inch HDD apparatus, and, as shown in FIG. 1, comprises a magnetic disk 21 having a recording surface where data is recorded, and a head slider 23 having magnetic heads for record and playback that are not shown.

The magnetic disk 21 is mounted with being fixed to a rotary shaft of a spindle motor 22, and is rotationally driven by the spindle motor 22. The head slider 23 is fixed in an end portion of a head arm 24. The head arm 24 is mounted in an actuator 25, and elastically supports the head slider 23. The head arm 24 is rotationally driven above a recording surface of the magnetic disk 21 by the actuator 25. Owing to this, the head slider 23 moves in the nearly radial direction of the magnetic disk 21, and data at an arbitrary position on a recording surface of the magnetic disk 21 is accessed.

In addition, the HDD apparatus is not limited to the one-inch HDD apparatus. Furthermore, one or more sheet of magnetic disk is sufficient for the magnetic disk 21, and a recording surface or surfaces are formed on one side or both sides of the magnetic disk. The head slider 23 and head arm 24 are provided according to the recording surface(s) of the magnetic disk 21.

A driving mechanism that is composed of the magnetic disk 21, spindle motor 22, head slider 23, head arm 24, and actuator 25 is contained in a housing, not shown, in the HDD apparatus. This driving mechanism is controlled by a control circuit 100. The control circuit 100 is implemented on a card (circuit board) that is not shown and is provided out of the housing containing the driving mechanism.

The control circuit 100 comprises an SPM driver 31, an HA driver 32, an R/W channel 33, an HDC (Hard Disk Controller) 34, an MPU (Micro Processing Unit) 35, memory 36, an HI (Host Interface) 37, and power consumption reduction circuit 40. The SPM driver 31, HA driver 32, and R/W channel 33 are connected to the HDC 34 respectively. The HDC 34, MPU 35, memory 36, HI 37, and power consumption reduction circuit 40 are mutually connected via a bus 39.

The SPM driver 31 drives the spindle motor 22. The HA driver 32 drives the actuator 25. The R/W channel 33 not only converts write data, recorded on the magnetic disk 21, into a recording signal for a recording magnetic head, but also converts a reproduced signal, reproduced from the magnetic disk 21 by a playback magnetic head, into read data. The HDC 34 executes calculation processing for servo control and error control at the time of data record/playback, and controls the SPM driver 31, HA driver 32, and R/W channel 33.

The MPU 35 controls each unit of the control circuit 100 with collaborating with the HDC 34 according to a control program and control data stored in the memory 36. The memory 36 stores the control program executed by the MPU 35, and the control data used by this control program. In addition, the memory 36 temporarily stores read data read from the magnetic disk 21 as well as write data recorded on the magnetic disk 21. A host apparatus accessing this HDD apparatus for data is connected to the HI 37. The HI 37 is an interface circuit which transmits data to and receives data from the host apparatus.

The SPM driver 31, HA driver 32, R/W channel 33, HDC 34, MPU 35, memory 36, and HI 37 are composed of one or more IC(s) (Integrated Circuit(s)) respectively. The control circuit 100 is composed of a plurality of ICs being provided by function. The power consumption reduction circuit 40 supplies a CK signal to these ICs.

FIG. 2 is a schematic diagram of the control circuit shown in FIG. 1.

As shown in FIG. 2, the power consumption. reduction circuit 40 comprises a clock frequency downconverting circuit 41 and an IC selection circuit 42. The IC selection circuit 42 is connected to each of the plurality of ICs 51, 52, . . . , 53. These ICs 51, 52, 53 correspond to ICs configuring the SPM driver 31, HA driver 32, R/W channel 33, HDC 34, MPU 35, memory 36, and HI 37 respectively. In addition, the ICs 51, 52, . . . , 53 can be configured by a single LSI (Large Scale Integrated circuit).

The clock signal generator 2 and reset IC 3 are connected to the power consumption reduction circuit 40. The clock signal generator 2 generates the CK signal for operating the ICs 51, 52, . . . , 53. The CK signal is inputted to the clock frequency downconverting circuit 41. The reset IC 3 generates the POR (Power-On Reset) signal at the time of power-on. The POR signal is inputted to the clock frequency downconverting circuit 41 and IC selection circuit 42.

The clock frequency downconverting circuit 41 reduces power consumption of the ICs 51, 52, . . . , 53 at the time of power-on. When the POR signal inputted is asserted, the clock frequency downconverting circuit 41 downconverts a frequency of the CK signal inputted and outputs the CK signal to the IC selection circuit 42. When the POR signal inputted is negated, the clock frequency downconverting circuit 41 outputs the CK signal, which is inputted, to the IC selection circuit 42 as it is.

The IC selection circuit 42 reduces the power consumption of the ICs 51, 52, . . . , 53 during normal operation of the control circuit 100 after power-on. The IC selection circuit 42 is well-known conventional power consumption reduction means. The IC selection circuit 42 detects operation requests and operating states of the ICs 51, 52, . . . , 53, and selects ICs, which operate, from among the ICs 51, 52, . . . , 53. The CK signal is outputted to the ICs selected by the IC selection circuit 42, and is not outputted to the ICs not selected by the IC selection circuit 42. Therefore, it is possible to reduce the entire power consumption of the ICs 51, 52, . . . , 53.

Nevertheless, all the ICs 51, 52, . . . , 53 are selected by the IC selection circuit 42 at the time of power-on. For this reason, the clock frequency downconverting circuit 41 is provided before the IC selection circuit 42, the clock frequency downconverting circuit 41 reducing the power consumption of the ICs 51, 52, . . . , 53 at the time of power-on.

FIG. 3 is a block diagram showing the configuration of the clock frequency downconverting circuit shown in FIG. 2. As shown in FIG. 3, the clock frequency downconverting circuit 41 comprises a frequency divider 60 where the CK signal is inputted. The frequency divider 60 divides the frequency of the CK signal inputted by, for example, 64 to output a CK64 signal whose frequency is downconverted.

Furthermore, the clock frequency downconverting circuit 41 comprises an inverter 611, an AND gate 612, a flip flop 613, an AND gate 614, an inverter 615, an AND gate 621, a flip flop 622, an AND gate 623, an inverter 624, and an OR gate 630.

The inverter 611 receives the POR signal, and inverts the POR signal, which is inputted, to output the POR signal to the AND gate 612. The AND gate 612 outputs an ADN1 signal, which is a logical product of an output signal of the inverter 611 and an INV2 signal outputted from the inverter 624, to the flip flop 613. The flip flop 613 latches the AND1 signal, which is outputted from the AND gate 612, with synchronizing with the CK64 signal outputted from the frequency divider 60, and outputs an FF1 signal, which is latched, to the AND gate 614 and inverter 615.

The AND gate 614 outputs an AND2 signal, which is a logical product of the CK64 signal, which is outputted from the frequency divider 60, and the FF1 signal, which is outputted from the flip flop 613, to the OR gate 630. The inverter 615 inverts the FF1 signal, which is outputted from the flip flop 613, to output an INV1 signal, which is inverted, to the AND gate 621. The AND gate 621 receives the POR signal, and outputs an AND3 signal, which is a logical product of the POR signal inputted and the INV1 signal outputted from the inverter 615, to the flip flop 622. The flip flop 622 receives the CK signal, and latches an AND3 signal, which is outputted from the AND gate 621, with synchronizing with the CK signal inputted, to output an FF2 signal, which is latched, to the AND gate 623 and inverter 624.

The AND gate 623 receives the CK signal and outputs an AND4 signal, which is a logical product of the CK signal inputted and the FF2 signal outputted from the flip flop 622, to the OR gate 630. The inverter 624 inverts the FF2 signal outputted from the flip flop 622 to output the INV2 signal, which is inverted, to the AND gate 612. The OR gate 630 outputs an OR signal, which is a logical sum of the AND2 signal, which is outputted from the AND gate 614, and the AND4 signal, which is outputted from the AND gate 623, to the IC selection circuit 42 shown in FIG. 2.

FIG. 4 is a timing chart showing the operation of the clock frequency downconverting circuit shown in FIG. 3.

Here, for simple description, it is assumed that the frequency divider 60 divides the frequency of the CK signal, which is inputted, by 4 to output a CK4 signal having a frequency downconverted.

When power is applied to the HDD apparatus, the POR signal inputted into the clock frequency downconverting circuit 41 is asserted at an L (Low) level. The POR signal at the L level is inputted into the inverter 611, and is inverted into the POR signal at an H (High) level to be inputted into the AND gate 612. At the same time, the POR signal at the L level is inputted into the AND gate 621. Owing to this, the AND3 signal in the AND gate 621 is kept at the L level.

The AND3 signal at the L level that is outputted from the AND gate 621 is latched by the flip flop 622 with being synchronized with the CK signal. The FF2 signal at the L level that is outputted from the flip flop 622 is inputted into the AND gate 623. Owing to this, an AND4 signal at the L level is outputted from the AND gate 623. At the same time, the FF2 signal at the L level, which is outputted from the flip flop 622, is inverted into the INV2 at the H level by the inverter 624 to be inputted into the AND gate 612. Owing to this, the AND1 signal at the H level is outputted from the AND gate 612.

The AND1 signal at the H level that is outputted from the AND gate 612 is latched by the flip flop 613 with being synchronized with the CK4 signal, and the FF1 signal at the H level is outputted from the flip flop 613. The FF1 signal at the H level that is outputted from the flip flop 613 is inputted into the AND gate 614. Owing to this, the CK4 signal (AND2 signal) from the frequency divider 60 is outputted from the AND gate 614. At the same time, the FF1 signal at the H level that is outputted from the flip flop 613 is inverted into the INV1 signal at the L level by the inverter 615 to be inputted into the AND gate 621.

The CK4 signal (AND2 signal), outputted from the AND gate 614, and the AND4 signal from the AND gate 623 are inputted into the OR gate 630 respectively. Owing to this, the CK4 signal is outputted from the OR gate 630. The CK4 signal whose frequency is obtained by dividing the frequency of the CK signal by 4 is supplied through the IC selection circuit 42 to the ICs 51, 52, . . . , 53 shown in FIG. 3. Therefore, the power consumption of the ICs 51, 52, . . . , 53 is reduced.

When power is applied to the HDD apparatus and a certain time elapses, the POR signal is negated at the H level. The POR signal at the H level is inputted into the inverter 611, and is inverted into the POR signal at the L level to be inputted into the AND gate 612. Owing to this, the AND1 signal in the AND gate 612 is kept at the L level. At the same time, the POR signal at the H level is inputted into the AND gate 621. The AND1 signal at the L level that is outputted from the AND gate 612 is latched with being synchronized with a trailing edge of the CK4 signal outputted from the frequency divider 60, and the FF1 signal at the L level is outputted from the flip flop 613. The FF1 signal at the L level that is outputted from the flip flop 613 is inputted into the AND gate 614. Owing to this, the AND2 signal at the L level is outputted from the AND gate 614. At the same time, the FF1 signal at the L level that is outputted from the flip flop 613 is inverted into the INV1 signal at the H level by the inverter 615 to be inputted into the AND gate 621.

Owing to this, the AND3 signal at the H level is outputted from the AND gate 621. The AND3 signal at the H level that is outputted from the AND gate 621 is latched with being synchronized with the CK signal by the flip flop 622, and the FF2 signal at the H level is outputted from the flip flop 622. The FF2 signal at the H level that is outputted from the flip flop 622 is inputted into the AND gate 623. Owing to this, the CK signal (AND4 signal) is outputted from the AND gate 623. At the same time, the FF2 signal at the H level that is outputted from the flip flop 622 is inverted into the INV2 signal at the L level by the inverter 624 to be inputted into the AND gate 612.

The AND2 signal at the L level, which is outputted from the AND gate 614, and the CK signal (AND4 signal), which is outputted from the AND gate 623, are inputted into the OR gate 630 respectively. Owing to this, the CK signal is outputted from the OR gate 630. The CK signal that is outputted from the OR gate 630 is outputted to the IC selection circuit 42. Then, the CK signal is supplied to the ICs selected by the IC selection circuit 42. Owing to this, the entire power consumption of the ICs 51, 52, . . . , 53 during normal operation of the control circuit 100 is reduced.

In addition, when the power of the HDD apparatus is shut down, the POR signal is asserted at the L level, and the control circuit 100 returns to such a state that the CK4 signal is outputted from the clock frequency downconverting circuit 41 with being synchronized with a trailing edge of the CK4 signal that is outputted from the frequency divider 60.

Embodiment 2

FIG. 5 is a block diagram showing the configuration of the clock frequency downconverting circuit in an HDD apparatus of Embodiment 2 according to the present invention.

The HDD apparatus of Embodiment 2 is an HDD apparatus obtained by replacing the clock frequency downconverting circuit 41 of the HDD apparatus in Embodiment 1, which is shown in FIG. 3, with a clock frequency downconverting circuit 70 shown in FIG. 5. This clock frequency downconverting circuit 70 downconverts the frequency of the CK signal into a frequency, which is 1/64 of the CK signal frequency, by sampling the CK signal corresponding to one pulse every time the CK signal corresponding to, for example, 64 pulses is inputted.

As shown in FIG. 5, the clock frequency downconverting circuit 70 comprises an AND gate 71, a flip flop 72, an OR gate 73, and a counter 74. The CK signal is inputted into the AND gate 71, flip flop 72, and counter 74. The POR signal is inputted into the OR gate 73.

The counter 74 repeats such operation that the counter 74 counts a number of pulses of the CK signal inputted and outputs a CNT signal, having pulse width slightly longer than a cycle of the CK signal, to the OR gate 73 when the CK signal corresponding to 64 pulses is counted. The OR gate 73 outputs an OR signal, which is a logical sum of the POR signal inputted and the CNT signal outputted from the counter 74, to the flip flop 72. The flip flop 72 latches the OR signal, which is outputted from the OR gate 73, with synchronizing with the CK signal inputted, and outputs an FF signal, which is latched, to the AND gate 71. The AND gate 71 outputs an AND signal, which is a logical product of the CK signal inputted and the FF signal that is outputted from the flip flop 72.

FIG. 6 is a timing chart showing the operation of the clock frequency downconverting circuit shown in FIG. 5.

When power is applied to the HDD apparatus, the POR signal inputted into the clock frequency downconverting circuit 70 is asserted at an L (Low) level. The POR signal at the L level is inputted into the OR gate 73. At this time, the number of pulses of the CK signal is counted by the counter 74. When the number of pulses reaches 64 pulses, the CNT signal at the H level is outputted to the OR gate 73. Owing to this, the OR signal at the H level is outputted from the OR gate 73. The OR signal at the H level is outputted from the OR gate 73 is latched by the flip flop 72 with being synchronized with a trailing edge of the CK signal to be outputted to the AND gate 71. Owing to this, the CK signal corresponding to one pulse is outputted from the AND gate 71. Subsequently, the same operation is repeated every time the CK signal corresponding to 64 pulses is inputted.

The CK64 signal whose frequency is obtained by dividing the frequency of the CK signal by 64 is supplied through the IC selection circuit 42 to the ICs 51, 52, . . . , 53 shown in FIG. 3. Therefore, the power consumption of the ICs 51, 52, . . . , 53 is reduced.

When power is applied to the HDD apparatus and a certain time elapses, the POR signal is negated at the H level. The OR signal at the H level is outputted from the OR gate 73, and the FF signal is outputted from the flip flop 72 with being synchronized with a trailing edge of the CK signal. The CK signal is outputted from the AND gate 71 and then supplied to the ICs selected by the IC selection circuit 42. Owing to this, the entire power consumption of the ICs 51, 52, . . . , 53 during normal operation of the control circuit 100 is reduced.

In addition, when the power of the HDD apparatus is shut down, the POR signal is asserted at the L level, and the CK signal corresponding to one pulse on the basis of the CNT signal from the counter 74 is outputted from the AND gate 71 every time the CK signal corresponding to 64 pulses is inputted.

FIGS. 7A and 7B are timing charts for comparing the operation of the clock frequency downconverting circuits in the first and second embodiments.

In FIGS. 7A and 7B, each signal CKin expresses the CK signal inputted into the clock frequency downconverting circuit, and each signal CKout does a signal outputted from the clock frequency downconverting circuit.

In the clock frequency downconverting circuit 41 according to Embodiment 1, other circuits operate due to the CK64 signal outputted from the frequency divider 60, and hence the POR signal is recognized in the resolution of the CK64 signal. As shown in FIG. 7A, in the clock frequency downconverting circuit 41, if the POR signal is negated, the CK signal is outputted with being synchronized with the trailing edge of the CK64 signal. Therefore, let a cycle of the CK signal be T, a time T1 from the POR signal being negated to the CK signal being outputted becomes 64T at a maximum.

Against this, in the clock frequency downconverting circuit 70 according to Embodiment 2, each circuit operates on the basis of the CK signal, and hence the CK signal is outputted with being synchronized with the trailing edge of the CK signal, if the POR signal is negated. Therefore, let a cycle of the CK signal be T, a time T2 from the POR signal being negated to the CK signal being outputted becomes T at a maximum. Hence it is possible to early transfer a state of the control circuit 100 to the state of normal operation after the power-on.

On the other hand, generally speaking, the clock frequency downconverting circuit 41 according to Embodiment 1 can be made smaller than the clock frequency downconverting circuit 70 according to Embodiment 2 from the viewpoint of circuit dimensions. Therefore, the clock frequency downconverting circuit 41 according to Embodiment 1 may be adopted if a time of returning to a normal frequency mode at the time of power-on and a time of transferring to a low frequency mode at the time of power-off are not limited. On the other hand, if there are certain limitations in these times, the clock frequency downconverting circuit 70 according to Embodiment 2 may be adopted.

It was verified by an experiment that consumption current that had been conventionally 300 mA was reduced to nearly 40–50 mA by providing the clock frequency downconverting circuit according to Embodiment 2 in a control circuit of a conventional HDD apparatus operating at 3.3 V of source voltage and dividing a CK signal frequency by 64 at power-on.

The clock frequency downconverting circuit according to Embodiment 2 can be applied to a memory cartridge whose power consumption is limited, for example, an HDD apparatus conforming to the CompactFlash (CF; trademark) proposed by SanDisk Inc. There are a Type 1 card, whose thickness is 3.3 mm, and a Type 2 card, whose thickness is 5 mm, in the CF cards. HDD apparatuses conforming to the Type 2 have been already developed.

In the CF card, it is determined that stand-by consumption current is 75 mA at a maximum at 3.3 V of source voltage and 100 mA at a maximum at 5 V of source voltage. For this reason, conventional HDD apparatuses cannot meet the standard in regard to 3.3 v of source voltage. An HDD according to the present invention can meet the standard in regard to 3.3 v of source voltage by providing the clock frequency, downconverting circuit according to Embodiment 2.

Advantages of the Invention

According to this invention, a power-on-reset signal is monitored at the time of power-on, and a clock signal having a frequency lower than a frequency at the time of a plurality of electronic circuits operating is outputted to the plurality of electronic circuits until this reset signal is negated. Owing to this, it is possible to reduce power consumption of the plurality of electronic circuits at the time of the power-on.

BRIEF DESCRIPTION OF THE DRAWINGS

FIG. 4 is a timing chart showing the operation of the clock frequency downconverting circuit shown in FIG. 3;

DESCRIPTION OF SYMBOLS

Figure 1:
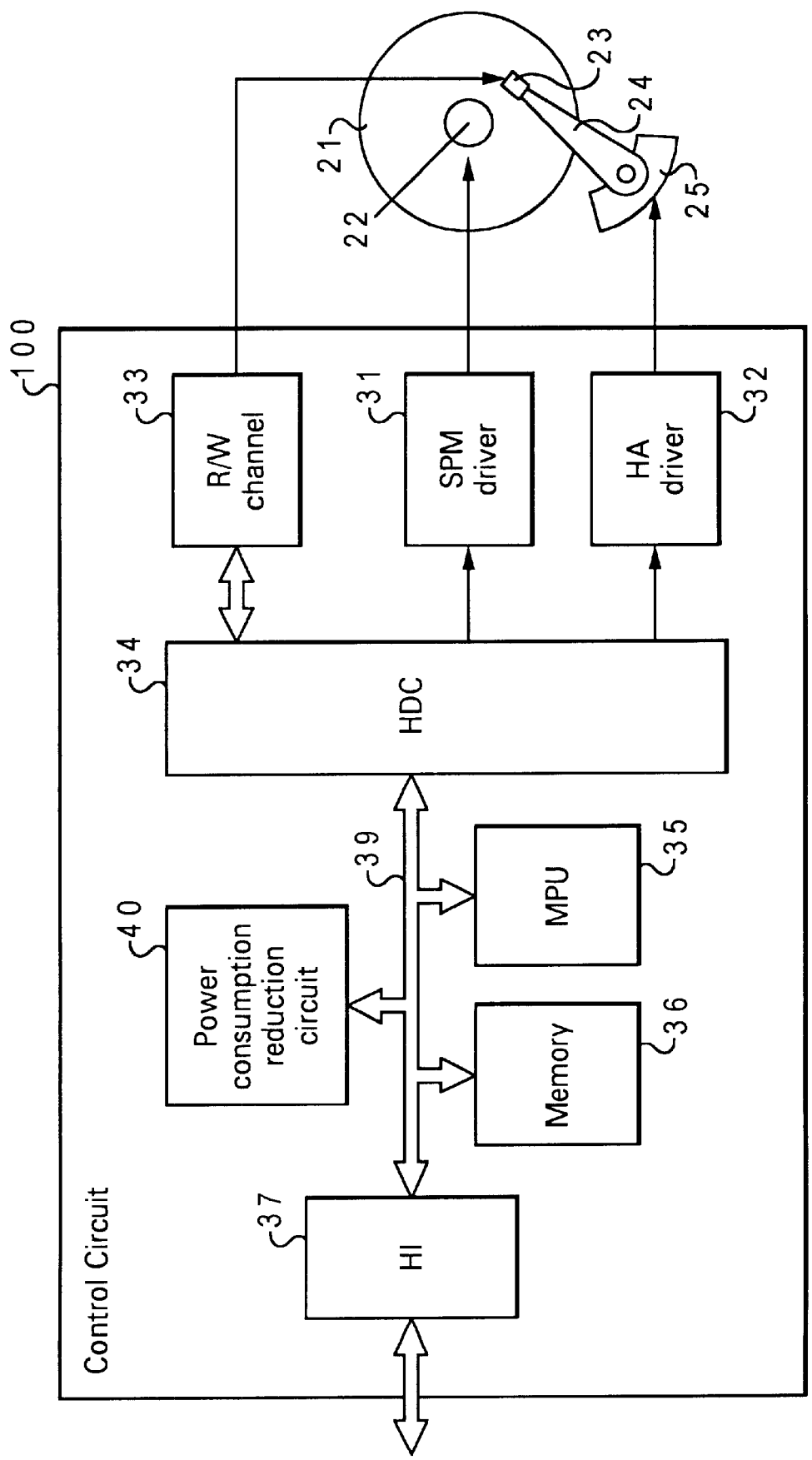
FIG. 1 is a schematic diagram showing the configuration of an HDD apparatus of Embodiment 1 according to the present invention.
Figure 2:
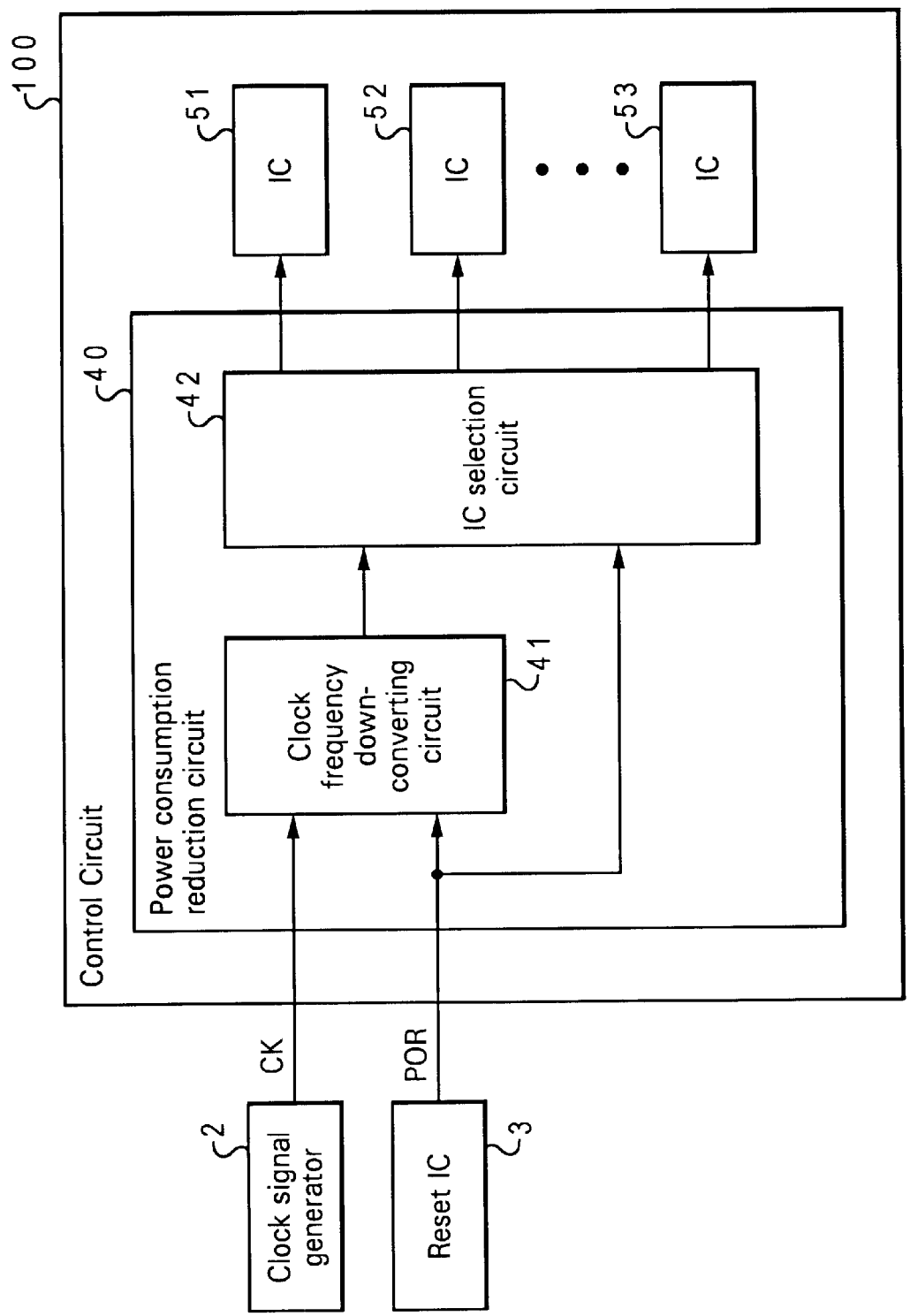
FIG. 2 is a schematic diagram of the control circuit shown in FIG. 1.
Figure 3:
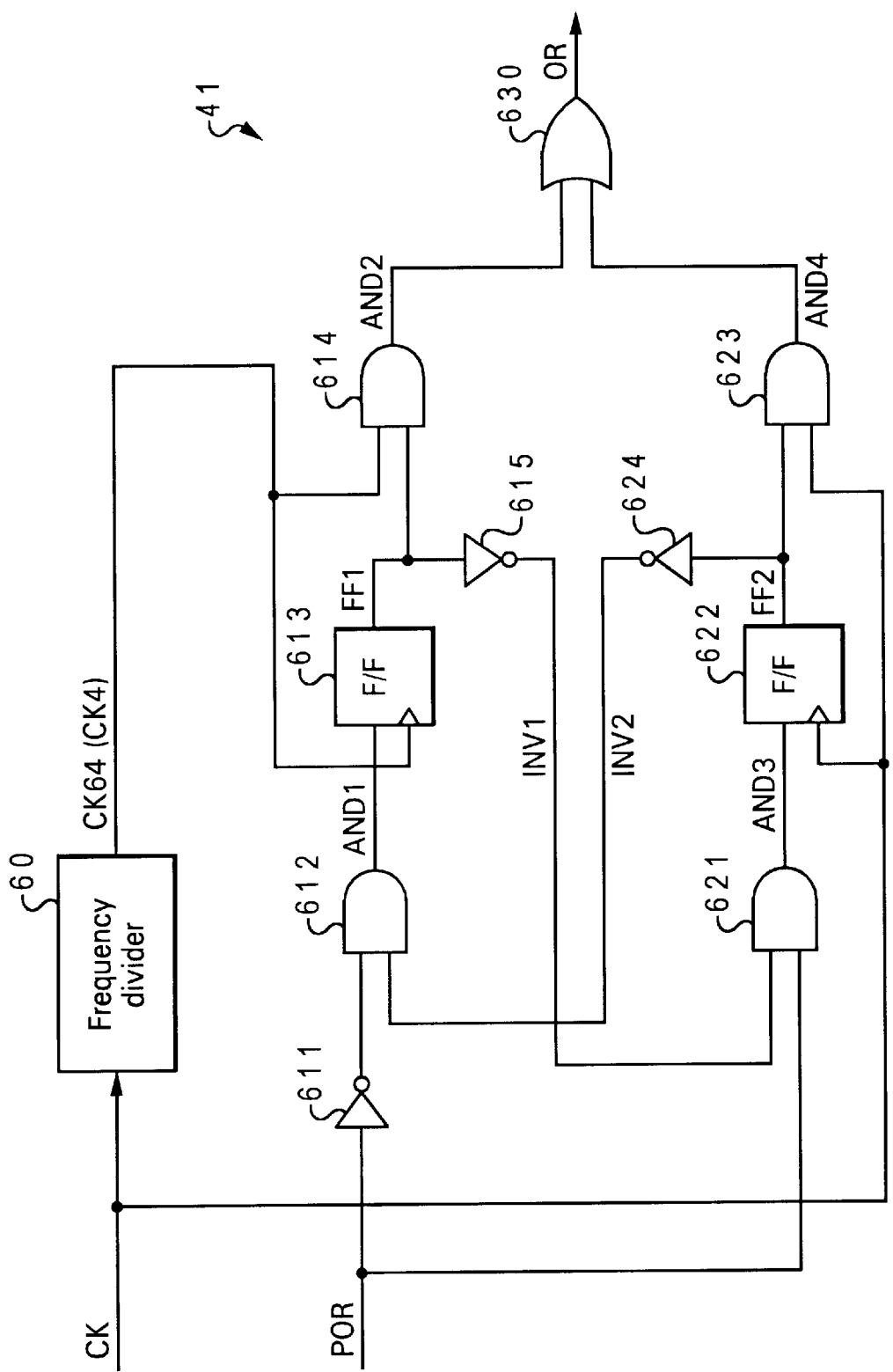
FIG. 3 is a block diagram showing the configuration of the clock frequency downconverting circuit shown in FIG. 2.
Figure 5:
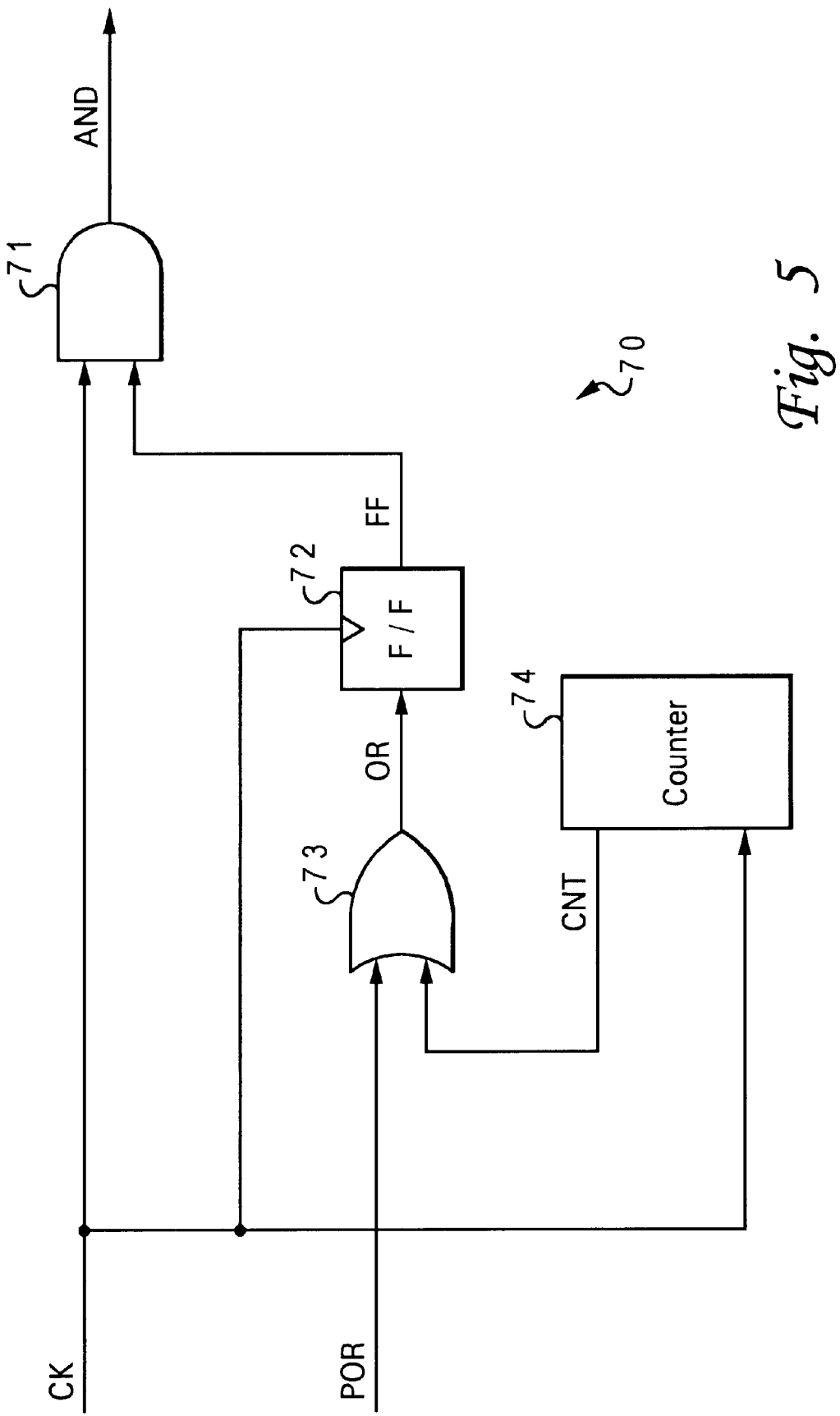
FIG. 5 is a block diagram showing the configuration of the clock frequency downconverting circuit in an HDD apparatus of Embodiment 2 according to the present invention.
Figure 6:
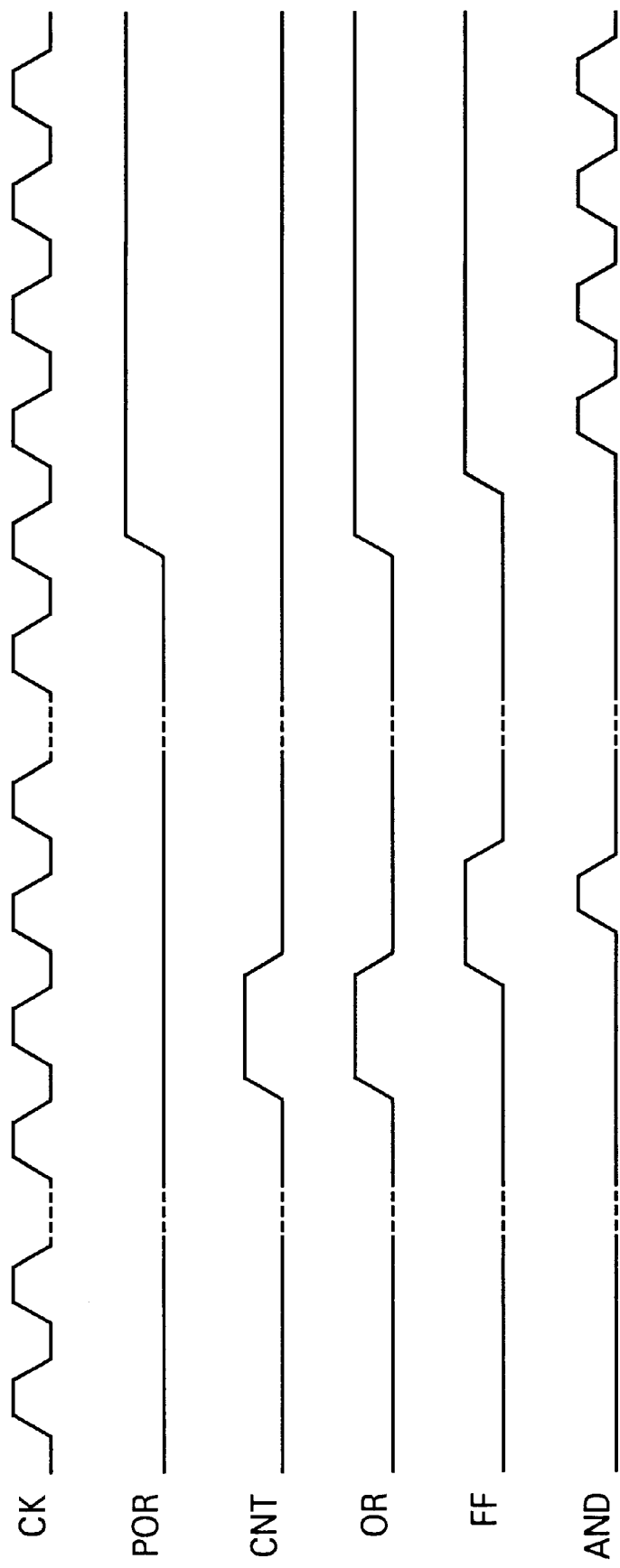
FIG. 6 is a timing chart showing the operation of the clock frequency downconverting circuit shown in FIG. 5.
Figure 7A:
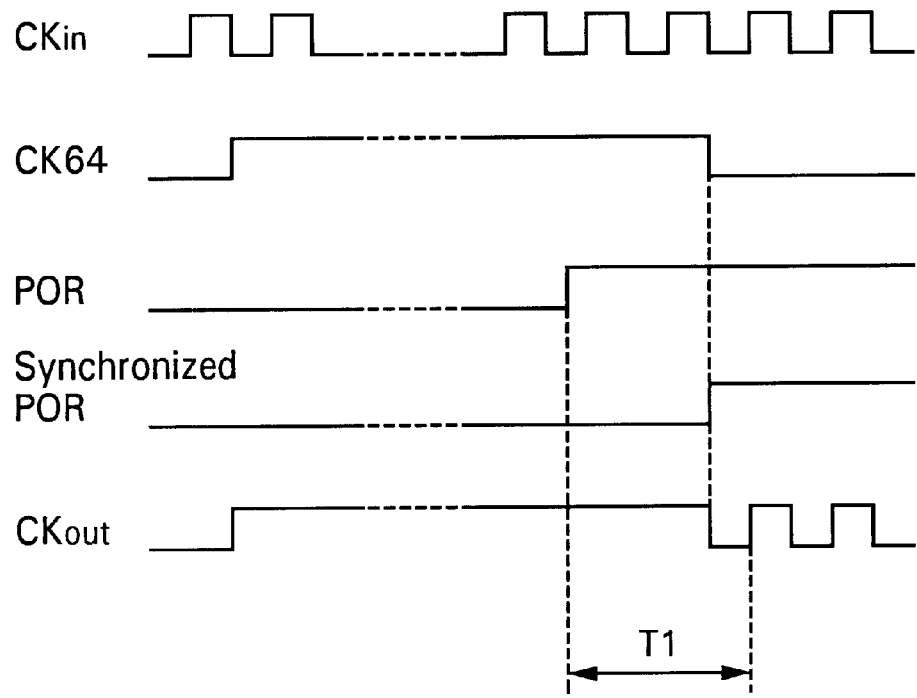
FIGS. 7A and 7B are timing charts for comparing the operation of the clock frequency downconverting circuits in the first and second embodiments.
Figure 7B:
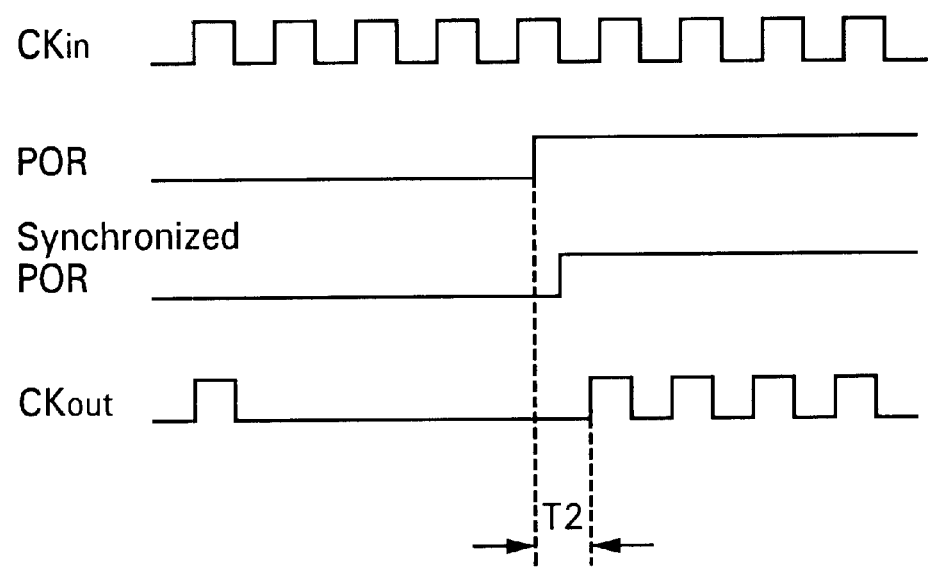
Figure 8:
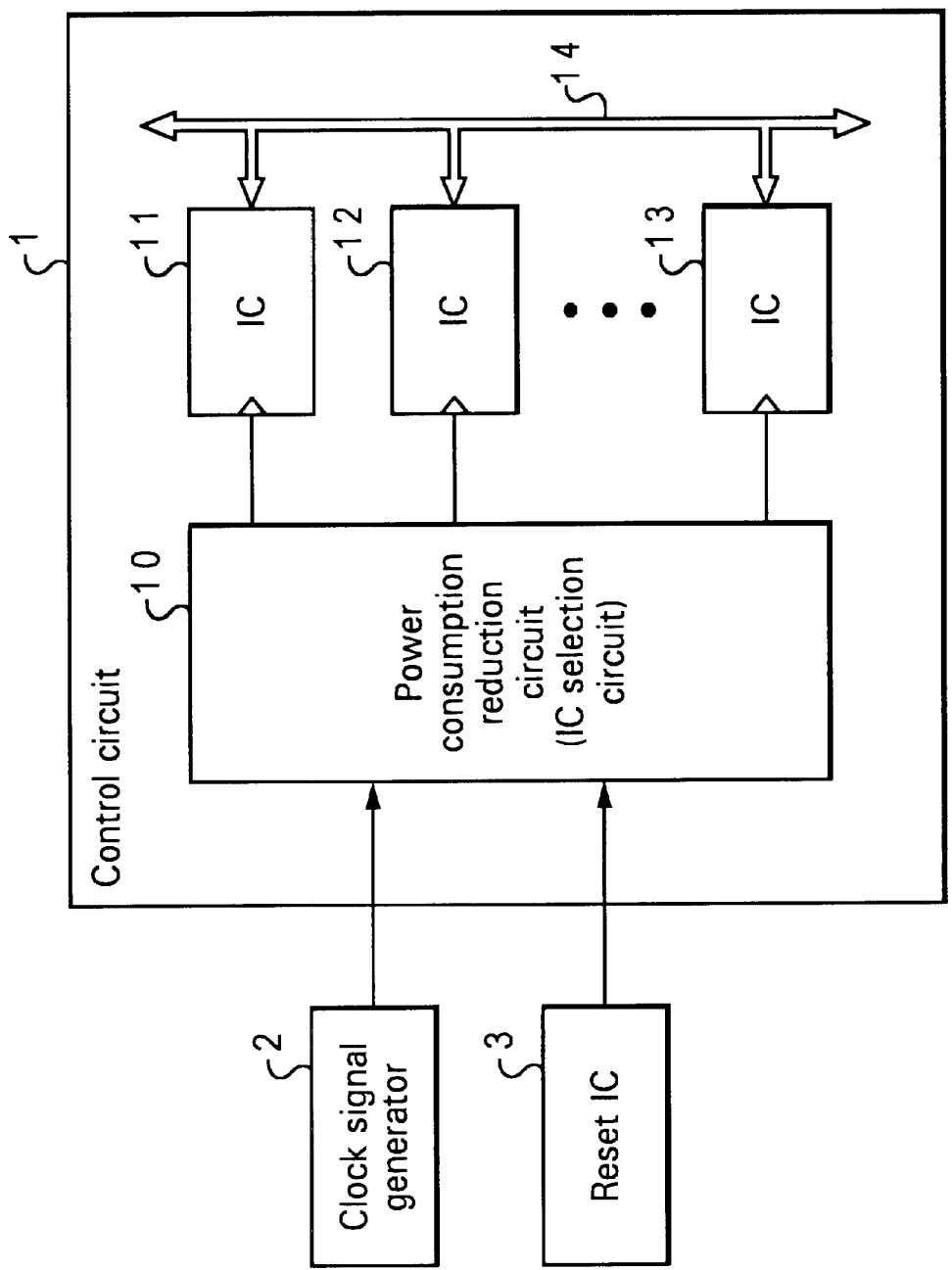
FIG. 8 is diagram showing the schematic configuration of a control circuit in a conventional HDD apparatus.

21 . . . Magnetic disk
22 . . . Spindle motor
23 . . . Head slider
24 . . . Head arm
25 . . . Actuator
31 . . . SPM driver
32 . . . HA driver
33 . . . R/W channel
34 . . . HDC
35 . . . MPU
36 . . . Memory
37 . . . HI
39 . . . Bus
40 . . . Power reduction circuit
41 . . . Clock frequency downconverting circuit
42 . . . IC selection circuit
51, 52, 53 . . . ICs
70 . . . Clock frequency downconverting circuit
71 . . . AND gate
72 . . . Flip flop
73 . . . OR gate
74 . . . Counter
100 . . . Control circuit
611, 615, 624 . . . Inverters
612, 614, 621, 623 . . . AND gates
613, 622 . . . Flip flops
630 . . . OR gate

What is claimed is:

1. A power consumption reduction method for reducing power consumed by at least one electronic circuit during power-on initialization of a system containing the at least one electronic circuit, the power consumption reduction method comprising the steps of:

sampling a clock signal received by said system during power-on initialization at a periodic interval corresponding to one pulse for every n pulses of the received clock signal, wherein n is an integer value greater than or equal to one;

monitoring a power-on-reset signal applied to the system at the time of power-on initialization; and responsive to the power-on-reset signal being asserted, outputting a clock signal having a frequency lower than an operating frequency of the at least one electronic circuit, corresponding to the one pulse, to the at least one electronic circuit until the power-on-reset signal is negated.

2. The power consumption reduction method according to claim 1, further comprising the steps of:

receiving a clock signal and a power-on-reset signal at the time of power-on initialization; and responsive to receiving the power-on-reset signal:
downconverting an original frequency of the clock signal to a predetermined reduced frequency; and
outputting the downconverted clock signal to the at least one electronic circuit; and a responsive to negation of said power-on-reset signal, outputting the clock signal at the original frequency to the at least one electronic circuit.

3. A power consumption reduction circuit, comprising:

a clock signal input terminal for receiving a clock signal;

a power-on-reset signal input terminal for receiving a power-on-reset signal;

a clock signal output terminal for delivering an output clock signal; and a frequency downconverting circuit comprising:
circuit means for downconverting a frequency of the clock signal inputted through the clock signal input terminal, wherein the circuit means for downconverting samples the clock signal received through the clock signal input at a periodic interval corresponding to one pulse for every n pulses of the received clock signal, wherein n is a predetermined integer greater than or equal to one; and
a switching unit for selecting between the downconverted clock signal and the clock signal inputted through the clock signal input terminal to be delivered to the clock signal output terminal, wherein said switching unit includes:
circuit means responsive to a power-on-reset signal being asserted for selecting the downconverted clock signal to be delivered to the clock signal output terminal; and
circuit means responsive to negation of said power-on-reset signal for selecting the clock signal, which is received through the clock signal input terminal, to be delivered to the clock signal output terminal.

4. The power consumption reduction circuit according to claim 3, wherein the frequency downconverting circuit comprises a frequency divider that reduces a frequency of the clock signal received through the clock signal input terminal, to a predetermined frequency.

5. The power consumption reduction circuit according to claim 3, wherein the frequency downconverting circuit comprises:

a counter for counting n pulses of the clock signal received through the clock signal input terminal and delivering an output signal for sampling the input clock signal when the number of pulses counted reaches n;

a logical sum circuit for outputting a logical sum of the counter output signal and the power-on-reset signal received through the power-on-reset signal input terminal; and a logical product circuit within the switching unit for outputting a logical product of the logical sum and the clock signal received through the clock signal input terminal, through the clock signal output terminal.

* * * * *

UNITED STATES PATENT AND TRADEMARK OFFICE
CERTIFICATE OF CORRECTION

PATENT NO.    : 6,429,704 B1                                          Page 1 of 1
DATED         : August 6, 2002
INVENTOR(S)   : Kanai et al.

It is certified that error appears in the above-identified patent and that said Letters Patent is hereby corrected as shown below:

Column 10,
Lines 23-27, please delete "signal having a frequency lower than an operating frequency of the at least one electronic circuit" and please add the word -- signal, -- after the word "clock";
Line 37, please delete the word "a" before "responsive"

Signed and Sealed this

Seventeenth Day of December, 2002

JAMES E. ROGAN
*Director of the United States Patent and Trademark Office*